United States Patent
Heilmeier et al.

(10) Patent No.: US 11,312,060 B2
(45) Date of Patent: Apr. 26, 2022

(54) FLUID CHANNEL

(71) Applicant: Krones AG, Neutraubling (DE)

(72) Inventors: Robert Heilmeier, Strasskirchen (DE);
Markus Glamsch, Wenzenbach (DE);
Thomas Jehl, Nittenau (DE)

(73) Assignee: KRONES AG, Neutraubling (DE)

(*) Notice: Subject to any disclaimer, the term of this patent is extended or adjusted under 35 U.S.C. 154(b) by 11 days.

(21) Appl. No.: 16/500,790

(22) PCT Filed: Apr. 10, 2018

(86) PCT No.: PCT/EP2018/000180
§ 371 (c)(1),
(2) Date: Oct. 3, 2019

(87) PCT Pub. No.: WO2018/188788
PCT Pub. Date: Oct. 18, 2018

(65) Prior Publication Data
US 2020/0108544 A1 Apr. 9, 2020

(30) Foreign Application Priority Data
Apr. 11, 2017 (DE) .......................... 102017206159.6

(51) Int. Cl.
*B29C 49/64* (2006.01)
*B29C 49/42* (2006.01)
(Continued)

(52) U.S. Cl.
CPC ............ *B29C 49/64* (2013.01); *B29C 49/421* (2013.01); *B29C 2049/4694* (2013.01); *B29C 2049/6692* (2013.01); *B29L 2031/7158* (2013.01)

(58) Field of Classification Search
CPC . B29C 49/64; B29C 35/16; B29C 2049/6692; B29C 2049/4694; B05B 13/0447
See application file for complete search history.

(56) References Cited

U.S. PATENT DOCUMENTS 5,738,817 A * 4/1998 Danforth ................ B33Y 10/00
264/603
6,187,097 B1 2/2001 Klaus
(Continued)

FOREIGN PATENT DOCUMENTS

DE 29716644 U1 11/1997
EP 2000285 A2 12/2008
(Continued)

OTHER PUBLICATIONS

Partial machine translation of Heilmeier et al. (EP 2000285 A2) dated Dec. 2008 obtained from the espace website. (Year: 2008).*
(Continued)

*Primary Examiner* — Robert B Davis
(74) *Attorney, Agent, or Firm* — Lowenstein Sandler LLP (57) ABSTRACT

A fluid channel of a container processing system for processing containers, such as bottles, is described, the container processing system comprising a blow molding machine and a container processing machine arranged downstream of the blow molding machine in the process direction. The fluid channel is arranged downstream of the blow molding machine and upstream of the downstream container treatment machine in the process direction and comprises at least one component, through which the fluid can flow and which comprises at least one outlet opening through which the fluid can escape from the fluid channel in the direction of a bottom of a container transported in the process direction. The component is produced by a generative manufacturing method.

15 Claims, 4 Drawing Sheets

(51) Int. Cl.
    *B29C 49/46*     (2006.01)
    *B29C 49/66*     (2006.01)
    *B29L 31/00*     (2006.01)

(56) References Cited

U.S. PATENT DOCUMENTS

| | | | |
|---|---|---|---|
| 2014/0084583 A1 | 3/2014 | Hemingway et al. | |
| 2015/0069669 A1* | 3/2015 | Dachs | B29C 49/64 264/523 |
| 2015/0315773 A1 | 11/2015 | Mullaney | |
| 2016/0288401 A1* | 10/2016 | Stu | B29C 53/84 |

FOREIGN PATENT DOCUMENTS

| | | |
|---|---|---|
| EP | 2987605 A1 | 2/2016 |
| WO | 2017125201 A1 | 7/2017 |

OTHER PUBLICATIONS

Fabricated the New World of 3D Printing, Hod Lispon et al, John Wiley & Sons, Inc, 2013, chapter 1, pp. 1-4. (Year: 2013).*
Fabricated the New World of 3D Printing, Hod Lispon et al, John Wiley & Sons, Inc, 2013, chapter 2, pp. 7-24. (Year: 2013).*
International Search Report and Written Opinion of PCT Application No. PCT/EP2018/000180 dated Jul. 20, 2018, 14 pages.
European Patent Office, Notice According to Article 94 (3) for European Patent Application No. EP 18720961, dated Nov. 18, 2021,4 pages, in German language.
European Patent Office, Notice According to Article 94 (3) for European Patent Application No. EP 18720961, dated Feb. 26, 2021, 8 pages, in German language.

* cited by examiner

FLUID CHANNEL

RELATED APPLICATIONS

This Application is a National Stage of International Application No. PCT/EP2018/000180 filed Apr. 10, 2018, which claims the benefit of German Patent Application 10 2017 206 159.6 filed Apr. 11, 2017, both of which are incorporated by reference herein.

FIELD OF THE INVENTION

The present invention refers to a fluid channel of a container processing system, a method for producing a component of such a fluid channel, and a container processing system having a fluid channel.

BACKGROUND

State of the art fluid channels are also known in connection with container processing systems. These fluid channels are usually used to cool the containers made from the preforms after leaving the blow molding machines. In particular, it has proved useful to cool the bottom area of the containers to avoid deformation of the container during further process steps, such as labeling, thus reducing waste.

For example, DE 29 716 644 U1 discloses a device for applying liquid to vessels by means of a spray tube which has a plurality of outlet openings through which a liquid is fed.

EP 2000285 B1 also discloses a channel-shaped device which can be used for cooling and drying containers, a fluid being introduced into this device for this purpose, and a corresponding opening being provided in the channel for applying the fluid to the containers.

The state of the art fluid channels are mostly made of metal plates, whereby for example the openings for the medium to exit are punched into the plates.

The previous fluid channels are therefore comparatively costly on the one hand, since metals have to be used, for example, and on the other hand complex to design. In particular, it is difficult and therefore costly to process the materials used in such a way that, on the one hand, they survive punching undamaged and, on the other hand, they can also be used in a curved fluid channel, which is designed, for example, according to the transport path of the containers.

DETAILED DESCRIPTION

Embodiments are directed to fluid channels that are produced at reduced costs, but with constant or even improved cooling performance as compared to the state of the art.

According to embodiments of the invention, an improved fluid channel and a method for producing such an improved fluid channel are described. Additionally, embodiments of a container processing system with a corresponding fluid channel are also described. Advantageous further developments of embodiments of the invention are also described.

According to embodiments of the invention, a fluid channel of a container processing system for processing containers such as bottles is described. The container processing system may include a blow molding machine and a container processing machine downstream of the blow molding machine in the process direction. The fluid channel may be arranged downstream of the blow molding machine and upstream of the downstream container processing machine and may include at least one component through which the fluid can flow and which comprises at least one outlet opening through which the fluid can exit the fluid channel in the direction of a bottom of a container transported in the process direction. The fluid channel is characterized in that the component is a component manufactured by a generative manufacturing method.

The process direction is the direction along which the containers are transported during their transport from the container processing system to the downstream container processing machine. This direction can also be essentially defined by an appropriate transport device, such as a neck-handling device, individual runners or conveyor belts. This direction does not have to be straight, but can also run in winding lines or other forms. In particular, the fluid channel can run parallel or essentially parallel but vertically offset to the transport device for the containers.

The outlet openings, which are arranged in such a way that the fluid can exit from the fluid channel in the direction of a bottom of a container transported in the process direction, are to be understood as such outlet openings through which the fluid can exit substantially in the opposite direction to gravity. It goes without saying that this function is also available when no container is being transported in the transport direction.

The term "fluid" should initially be understood to mean all substances which are not in the solid state of aggregation. In particular, this includes gases or gas mixtures, such as air, but also liquids, such as water.

Unless otherwise specified, the generative manufacturing process shall mean any process in which the component is manufactured directly from a formless (liquid, gel, powder or the like) or neutral material (strip, wire or sheet) by means of chemical and/or physical processes. Fused Deposition Modeling (FDM), selective laser sintering and the Multi Jet Fusion process from Hewlett Packard have proven to be particularly advantageous. Acrylonitrile-butadiene-styrene copolymers (ABS) and polyamides such as PA12 are particularly suitable as advantageous materials.

The use of the generative manufacturing method for at least one component of the fluid channel allows, on the one hand, cost-effective production compared with subsequent machining of a metal plate and, on the other hand, the possibility of precisely influencing certain functional properties, such as the flow behavior induced by the component into the fluid, and thus improving the cooling performance of the fluid channel.

In an embodiment it is provided that the outlet opening is formed as one or a plurality of nozzles and/or as an essentially uninterrupted outlet channel. The essentially uninterrupted outlet channel is to be understood as such a channel in which the ratio of the regions permeable to the fluid to the regions not permeable to the fluid is at least 5:1, preferably 20:1, particularly preferably greater than 100:1. The interruptions may be, for example, elements to stabilize the component, or lamellas or similar components which may cause a change in the direction of flow of the fluid through the outlet opening.

In a preferred further development of this embodiment, the outlet directions for the fluid predetermined by two different nozzles are different and/or the outlet direction along the outlet channel varies. In this way, the fluid can be selectively discharged over the entire length of the fluid channel, thus optimizing the cooling of the bottom of the containers. Compared to the usual fluid channels, where the outlet openings are essentially punched from a thin metal sheet, this embodiment has the advantage that the fluid channel's properties influencing the outlet direction of the fluid can already be impressed into the component during manufacture and without the use of additional elements, such as fans.

However, it can also be provided that the outlet directions of all outlet openings are the same and, in particular, are aligned against the direction of movement of the bottles in a corresponding transport device, i.e. against the process direction. This does not mean that the outlet directions must necessarily be parallel and opposite to the process direction, but in this embodiment a component of a direction vector representing the outlet direction has a non-zero component in a direction opposite to the process direction and a non-zero component in the direction of the bottom of a bottle to be cooled or in the direction of the transport device of the containers.

In one embodiment, the component may have a curvature. A fluid channel containing such a component can thus be better adapted to the shape of a transport device or the distance travelled by the containers in the transport device, without having to interrupt the fluid channel. The fluid channel can therefore be designed with only one feed and optional discharge for the fluid over the entire length of the transport device or over the entire desired cooling section. Thus interruptions in the fluid channel can be avoided.

It may further be provided that the component comprises at least one fastening element for connecting to another component of the fluid channel and/or for fastening the component to a part of the container processing system. Welding or other attachment of such elements, such as riveting or punching, or the subsequent joining with screws can be omitted and the necessary elements for joining and fastening can be integrated directly into the component during the manufacture of the component, which can reduce the manufacturing costs and improve the service life of the component.

In one embodiment, the outer geometry of the component is such that particles located on the outer surface of the component move away from the bottom of the container under the influence of gravity. Analogous to this is to understand a displacement of the particles in a direction away from the transport path of the containers. In particular, this refers to embodiments in which the component in the installed state has a cross-section with a concave surface that encloses the outlet opening. These include in particular triangular cross-sections or external shapes for the component.

Optionally, the component can be chemically and/or mechanically treated after the actual manufacture to smooth the surfaces and thus support the removal of particles and liquids.

There are several methods that can be used, either individually or in any combination. In fused deposition modeling as a manufacturing process for the components. If ABS (acrylonitrile-butadiene-styrene copolymers) is used here as the material for the components, post-treatment with an acetone-based solution can be carried out in order to smooth the surface and thus make it more difficult for dirt particles to adhere. However, this has the disadvantage that the material becomes more brittle. Furthermore, the components can also be sealed with a resin, which not only results in a certain sealing of the components in general, but also in a smoothing of the surface, especially with ABS-based components.

If SLS printing is used as the manufacturing process (selective laser sintering), the surface of the components can be post-treated by painting. The surface can also be treated with blasting (sandblasting or similar) to smooth the surface and improve its haptic properties. In order to avoid possible deposits of powder from the sintering process on the surface, a coating or treatment with a resin can also be carried out here. A coating with PTFE (polytetrafluoroethylene) is also possible.

It may also be provided that the component comprises a seal produced by the generative manufacturing process and is an integral part of the component. The seal need not be a seal made of the same material as the component. For example, the seal can be cut out of an NBR plate. The production of the component as a whole can thus be simplified, since a seal can also be integrated during the production of the component, and thus subsequent steps in the production of the component can be saved.

In one embodiment, the fluid channel is essentially formed by several components. The outlet opening is formed as a substantially continuous outlet channel, the outlet channel extending over at least 50%, preferably 75%, preferably 90%, or more of the length of the fluid channel. The total cost of producing the fluid channel can thus be reduced, while at the same time ensuring that the container bottoms are cooled practically along the entire length of the fluid channel.

In a further development of this embodiment, the outlet channel extends uninterruptedly over at least two adjacent components. Interference with fluid leakage through the transition from a first component to a second component can thus be avoided, with manufacturing costs for this remaining relatively low due to the use of the generative method for the components compared to machining a flat metal sheet or several adjacent metal sheets.

It may also be provided that the fluid flows through a flow channel within the component and can pass from there to the outlet opening, the cross-section of the flow channel varying perpendicularly to the direction of flow of the fluid. Since the quantity of fluid flowing through the flow channel decreases with increasing distance from the fluid feed device into the fluid channel (fluid is discharged from the flow channel through the outlet openings), the cross-section of the flow channel can be varied to achieve an essentially constant or, in some areas, higher outflow velocity of the fluid. It is particularly advantageous to select the outflow velocity in the various areas of the flow channel in such a way that the greatest cooling capacity per time unit is achieved at the beginning of the flow channel (seen in the transport direction of the containers to be cooled).

Furthermore, the internal cross-section of the component may be different from the external cross-section. While the flow properties of the fluid are essentially determined by the internal cross-section of the component, the properties with respect to the rejection of dirt or similar particles are essentially determined by the external cross-section of the component. Both properties can be advantageously optimized by using generative manufacturing methods.

The method according to the invention for manufacturing a component of a fluid channel according to one of the above embodiments comprises in particular 3D printing, as here in the special multi jet fusion process, as known for example from the company HP (Hewlett Packard). These methods are cost-effective and flexible and allow the effective production of corresponding components.

In a further development of the method at least two components of the fluid channel are manufactured with the generative method and/or are manufactured in a process step of the generative method. This means that the production of the two components in a single process step means that the device which produces the components produces them essentially simultaneously or at least without interrupting the production process, for example by removing the first component which has already been completed. The advantage is that at least two components are nested within a defined installation space of the 3D printer, so that the majority of the required components of a fluid channel can be produced in one process step. If several identical fluid channels are to be produced from at least two components each, it is also conceivable that the identical components are produced in a first step and further identical components in a further step. The time required to manufacture these two components can thus be reduced. As a result, costs can also be saved.

In a further development of this embodiment, all components of the fluid channel are manufactured in a process step of the generative method. With regard to the significance of production in one process step, the above applies. The advantage of reducing manufacturing costs is even more evident with this embodiment.

The inventive container processing system for processing containers, such as bottles, comprises a blow molding machine and a container processing machine arranged downstream of the blow molding machine in the process direction, as well as a fluid channel between the blow molding machine and the downstream container processing machine, wherein the fluid channel is a fluid channel according to one of the above embodiments. The container processing system can be manufactured at reduced cost by using the fluid channel according to the invention, while the quality of the manufactured containers remains the same compared to the state of the art or can even be improved on.

Figure 1:
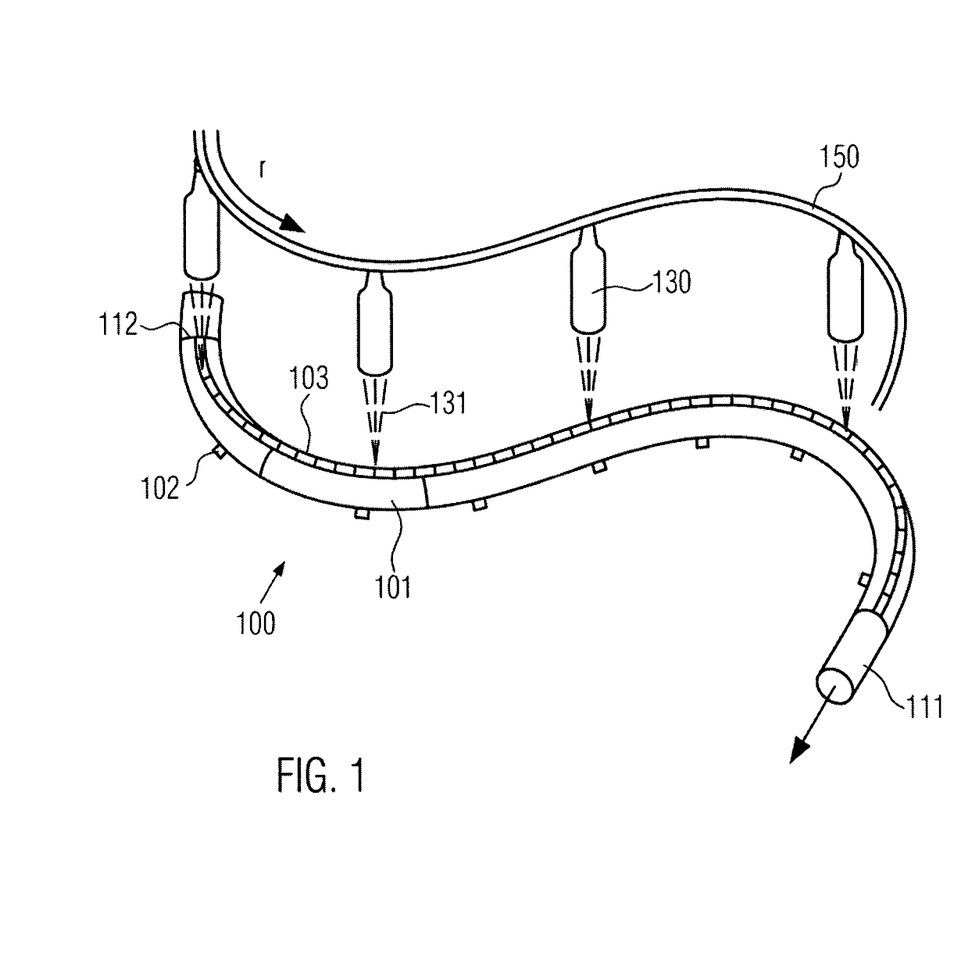
FIG. 1 shows a schematic view of a fluid channel according to an embodiment.

With reference now to the figures, FIG. 1 shows a fluid channel 100 according to the invention in relation to a transport device 150 for containers 130, which are transported along the arrow direction shown, according to an embodiment. The fluid channel shown comprises a not further detailed inlet 112 for a fluid, in particular a gas such as air or similar. The fluid channel then extends continuously up to an optional outlet 111, from which at least part of the fluid supplied via inlet 112 can exit again. During the distance between inlet and outlet, the fluid channel 100 is substantially formed as a hollow tube having at least one outlet opening 103 through which the fluid can flow out. The outlet opening is arranged such that the fluid (represented by reference numeral 131) can flow out in the direction of the bottom of a container 130, which is moved in the transport device 150, in order to cool it.

The transport device 150 can in particular be at least one transfer starwheel which fixes the containers 130 in the neck area (neck handling) or elsewhere. The shape of the fluid channel can then correspond to that of the transfer starwheel, or follow the direction of movement of the containers in the transfer starwheel.

One or more cleaning openings (not shown) may be provided at the bottom of the fluid channel or at the side opposite the outlet opening to ensure drainage of condensed water and/or detergents. Compared to the at least one outlet opening for the fluid, these are designed in such a way that only a very small percentage of the cooling fluid escapes through the fluid channel during operation. The cleaning openings can also be closed, for example using mechanical sliders.

While the fluid channel between the inlet and the outlet can essentially be described as a pipe, this is not to be understood as restrictive with regard to the outer shape and the inner shape of the fluid channel. As will be described below, the outer shape can in principle be arbitrary and the inner shape, in particular the inner cross-section of the fluid channel, can also be arbitrary, provided that at least a flow of the fluid from inlet 112 to outlet and through the outlet opening 103 in the direction of the bottom of a container 130 is possible. For example, the inner cross-section can be round or angular, perpendicular to the flow direction of the fluid. It can also vary along the path of fluid channel 100 from inlet to outlet. The bottom area (or an area opposite the outlet opening) of the cross-section or the fluid channel as a whole may be inclined towards the optional cleaning opening to allow condensate or detergent to drain off.

According to embodiments of the invention, the fluid channel 100 comprises at least one component 101 produced by a generative manufacturing method. The generative manufacturing method can in principle be any generative manufacturing method, but 3D printing and the multi-jet fusion method in particular are preferred.

While here only one component 101 is shown, which was manufactured with such a generative manufacturing method, the fluid channel 100 can also comprise a plurality of such components 101, or even consist completely of components manufactured with generative manufacturing methods. These can be detachably or non-detachably connected to each other. Depending on the length of the fluid channel, the fluid channel can be formed by a single component manufactured using a generative manufacturing method.

It may in principle be provided that, provided that the length of the fluid channel does not exceed 1 m, the fluid channel is formed by a single component 101 manufactured by means of a generative manufacturing method. If the length is considerably greater than 1 m, for example 2 m or 3 m, the fluid channel may be composed of at least two components, preferably up to 10 or up to 20 correspondingly manufactured components, or at least comprise corresponding components.

As already indicated in FIG. 1, the fluid channel is not necessarily straight, but can also have a curvature that essentially follows the shape of the transport path for the containers 130. Accordingly, any component 101 or at least one component 101 may have a curvature. The corresponding radii of curvature as a measure for the curvature of the component can be between 0.2 m and several meters, even several 10 m. Also smaller or even larger radii of curvature are possible without difficulties due to the production of the components of the fluid channel by means of generative methods.

FIG. 1 also schematically shows that the fluid channel 100 as such can be fastened to the floor of a workshop, a table or within a machine using fastening elements 102. At least one such fastening element can also be provided on component 101. It is also conceivable that the fastening element is geometrically designed in such a way that two components 101 can be fastened simultaneously (in one operation) to each other and to the floor, table or inside a machine.

FIGS. 2a to 2f describe different embodiments of component 101, as shown in FIG. 1. It goes without saying that these embodiments can also be combined with this embodiment if the shape of the fluid channel of FIG. 1 is selected accordingly. In the following embodiments, the acceleration due to gravity g is shown with a corresponding indication of direction (arrow) to illustrate the usual orientation during operation of the fluid channel for cooling containers, in particular their bottom, and thus also the orientation of the component.

Figure 2A:
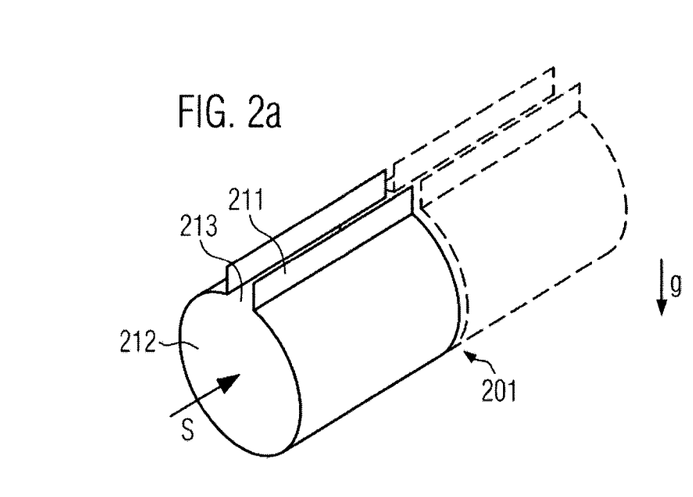
FIGS. 2a-f show a schematic representation of embodiments of the component.

FIG. 2a shows a component 201 whose cross-section perpendicular to the direction of flow s is essentially circular. This creates a flow channel 212 through which the fluid, such as air, can flow. The outlet opening 213 extends upwards (i.e. when the fluid channel is constructed in the direction of the transport device 150, as shown in FIG. 1) and is formed in this embodiment by two plates 211 which run substantially parallel to one another.

Figure 2B:
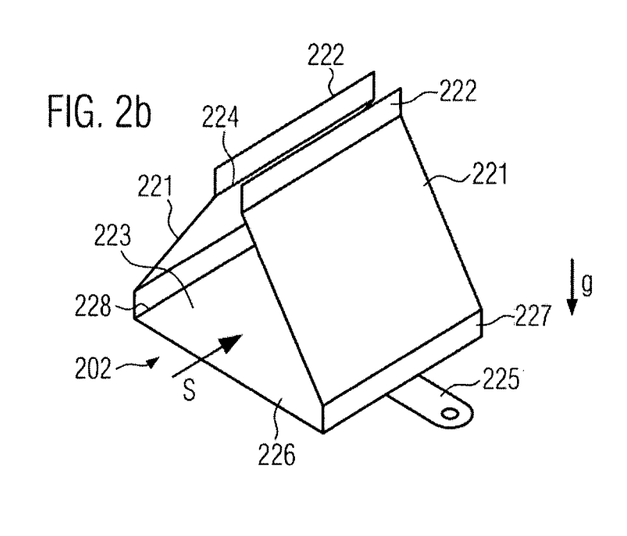

FIG. 2b shows a component 202 whose cross-section perpendicular to the direction of flow s of a fluid is substantially triangular or trapezoidal. Analogous to FIG. 2a, the outlet opening 224 is limited by two plates 222. The term "plate" here refers only to the shape of these components as elongated and preferably thin (only a few millimeters or even less than 2 mm thick) and should not be regarded as restrictive of the materials used. Starting from these, a respective boundary surface 221, which is formed as a flat surface, extends to a base surface so that a triangular cross-sectional profile 223 is formed with the exception of the surfaces 227 and 228. This embodiment offers the advantage that dirt can slide downwards from the boundary surfaces 221 only under the influence of gravity (i.e. away from the bottom of the container, which would be above the outlet opening 224 in the Figure shown). This can prevent, for example, dust from being whirled up by the escape of the fluid through the outlet opening 224 and adhering to the outside of the container, or, in the worst case, from penetrating into the container, thus contaminating the interior of the container.

Furthermore, in the embodiment shown in FIG. 2b, a fastening element 225 is shown for fixing component 202, for example, to the floor of a factory building or on a table. Such a fastening element may also be provided in the embodiment shown in FIG. 2a. This can be provided as an integral part of component 202 in such a way that it is formed together with the component during the manufacturing process of component 202 using the generative manufacturing method and does not have to be joined to the component only afterwards, but is already formed as an integral part of the component during manufacture.

Figure 2C:
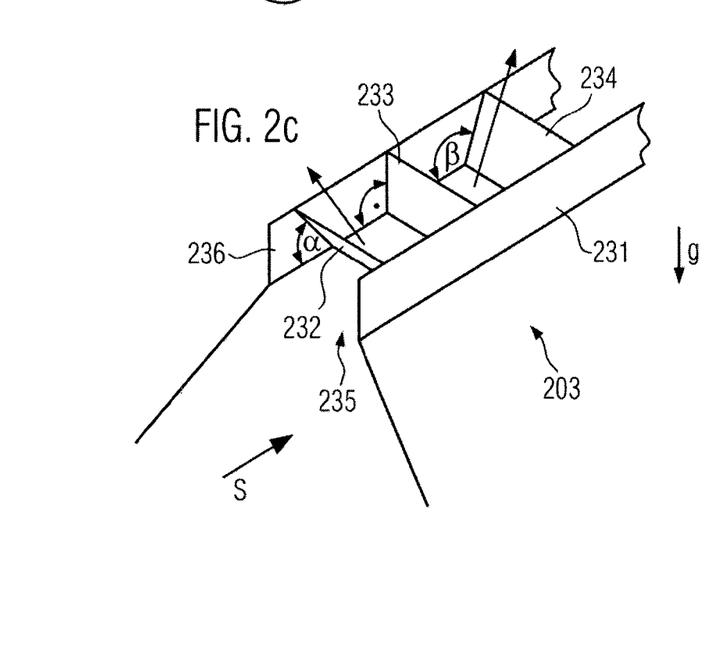

FIG. 2c shows a preferred embodiment of an outlet opening 235 in a component 203, as it could also be implemented, for example, in the outlet openings of FIGS. 2a and 2b and thus also in the outlet opening according to FIG. 1.

In this embodiment it is provided that between the boundary surfaces 231 and 236 there are arranged adjusting plates 232 to 234 which form an angle ($\alpha$, $\beta$, ...) with the direction of flows of the fluid through the flow channel of component 203 which can be different from 90°. Here, too, the term "plate" is to be understood merely as characterizing the shape and not as restricting the materials used. As can be seen from FIG. 2c, the adjusting plates are cross struts which run between the lateral boundaries (boundary surfaces) of the outlet opening. These can preferably be essentially flat (only a few millimeters thick) and flat cross struts. Lamellae or lamellar structures can also be considered.

In the embodiment shown, for example, the adjusting plate 232 with the flow direction s includes an angle $\alpha$, the adjusting plate 233 a right angle, and the adjusting plate 234 the angle $\beta$. By these angles, the outlet directions (each represented by arrows) of the fluid can be varied over the length of the component and ultimately over the length of the entire fluid channel.

Figure 2D:
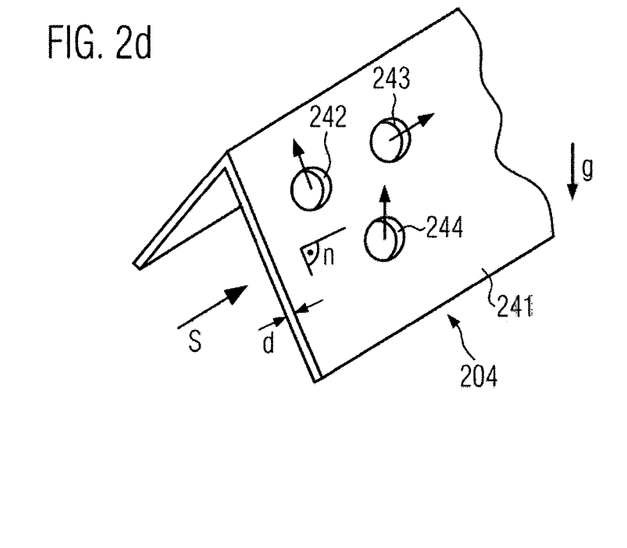

In the embodiment shown in FIG. 2d, a component 204 is schematically shown, which, for example, may have a similar cross-section to that in FIG. 2b. While in all other embodiments the boundary surfaces of the components necessarily reach a certain expansion of up to a few millimeters due to the generative manufacturing method, this is only shown more clearly here in order to better describe this embodiment. In the embodiment shown in FIG. 2d, the outlet openings are formed by a plurality of nozzles or holes 242, 243 and 244, respectively, which are provided as substantially cylindrical openings in the boundary surface 241. Since the component was manufactured using a generative manufacturing method, it is not necessary during the manufacture of the component to insert nozzles 242 to 244 into the component after manufacture of the component, for example by a destructive process such as drilling, but nozzles 242 to 244 can be formed integrally with the component during manufacture by not introducing any material in the areas of nozzles 242 to 244 during the generative manufacturing method.

The central axes of the nozzles do not necessarily have to be parallel to each other, but, as already indicated in FIG. 2d, can form an angle with the surface normal n of the boundary surface 241. Analogous, these central axes also include an angle with the flow direction s of the fluid through component 204. The nozzles or openings 242 to 244 offer the advantage that the flow of the fluid through the finite thickness of the material layer of the boundary surface 241 forces the fluid or the flow of the fluid in the direction of the central axes, so that the direction in which the fluid meets the bottom of the container can also be varied.

Figure 2E:
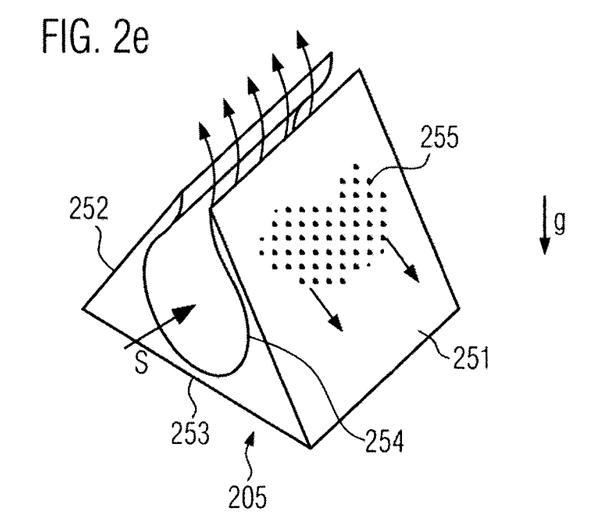

FIG. 2e shows an embodiment in which the component 205 comprises on the one hand outer boundary surfaces 251, 252 and 253, and on the other hand an inner boundary surface 254. The internal cross-section of component 205 is perpendicular to the direction of flow s and in this embodiment differs from the external cross-section of the component perpendicular to the direction of flow s. This makes it possible to meet different requirements, in particular with regard to the flow properties of the fluid along the flow channel inside component 205 on the one hand, and properties of the surface of component 205, in particular with regard to the rejection of dirt, on the other hand. As shown here, e.g. outer surface 251 ensures that dirt particles 255 glide down at least partly in direction of gravity along arrow direction shown.

Figure 2F:
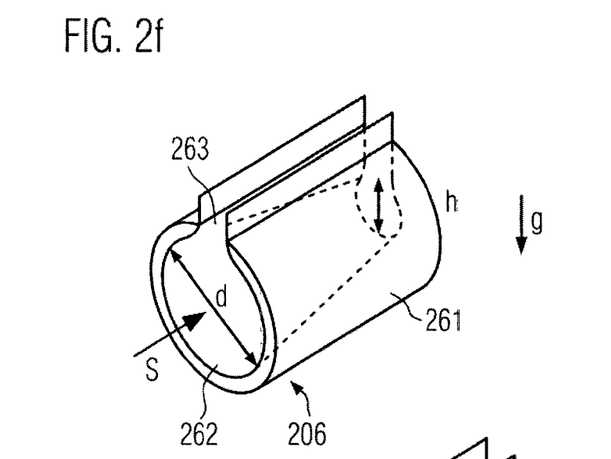

FIG. 2f shows another embodiment in which component 206 comprises an outer boundary surface 261 and an inner boundary surface 262. The outer boundary surface represents a cylinder shell with a constant diameter. However, the inner boundary surface of the component is designed as a truncated cone in such a way that the diameter d is greater than the diameter h, while the inner boundary surface always opens into the outlet opening 263. With this embodiment, it can be ensured, for example, that the outflow velocity of the medium can be kept constant over the entire length of the fluid channel, since, for example, the inner diameter can be reduced over the length of the component in the direction of flow s by a measure that depends on the amount of fluid escaping through the outlet opening.

All the embodiments described here can be combined with each other. For example, a component may include both an outlet opening in the form of slots as described in FIGS. 2a to 2c, and 2e and 2f, and additionally one or more nozzles 242 to 244 as shown in FIG. 2d. In addition, the adjusting plates shown in FIG. 2c can be integrated in any of the other embodiments 2a, 2b and 2e to 2f. Other embodiments and combinations of the embodiments described in FIG. 2 are also conceivable.

Figure 3A:
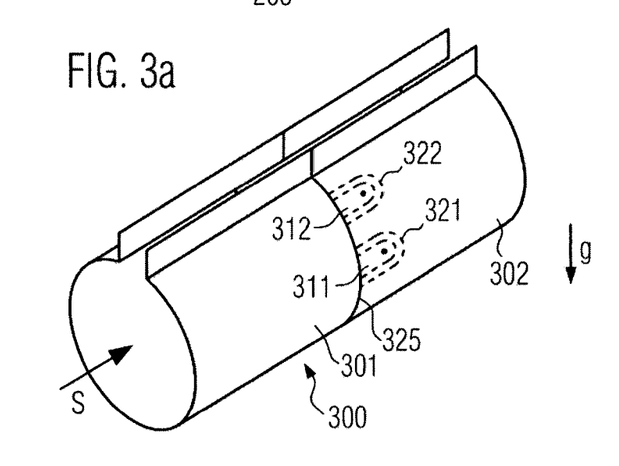
FIGS. 3a-b show a schematic representation of two interconnectable components according to an embodiment.
Figure 3B:
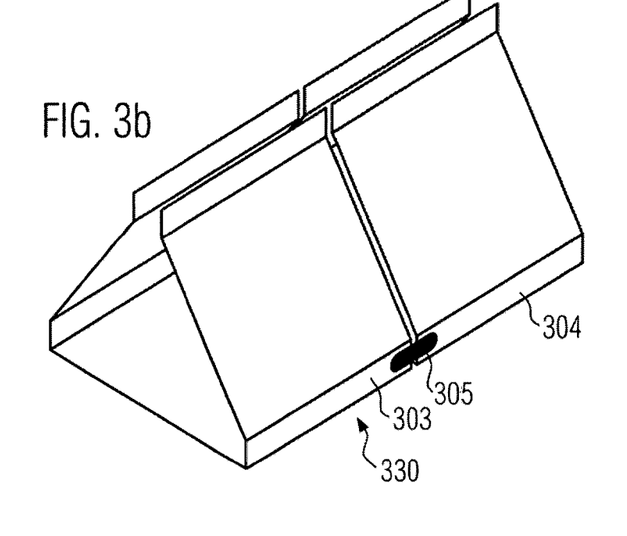

FIGS. 3a and 3b show two different embodiments for connecting two generatively produced components.

FIG. 3a shows two components 301 and 302 as part of a fluid channel 300. In this embodiment, the components 301 and 302 include click connections in the interior through which the fluid flows along the flow direction s. The click connections may be such that one component 301 has catches 311 and 312 and the component 302 has notches 321, 322 into which the catch can snap. The respective elements 311 and 312, as well as 321, 322 are preferably already formed during the manufacturing process of the components as an integral part of the components.

Alternatively, it may also be provided that the components 301 and 302 can be connected to one another via a continuous connecting element provided along the entire connecting line 325, in particular a seal, which is an integral part of at least one of the components 301 and 302. Irrespective of this, it may in principle be provided that each of the components during the generative manufacturing methods is fitted with a seal or sealing element which is manufactured as an integral part of the component. Some generative manufacturing methods also allow different materials to be combined so that, depending on the manufacturing method chosen, the seals can contain a different material from the rest of the component's material.

FIG. 3b shows an embodiment in which the components 303, 304 of a fluid channel 330 are connected to each other via an external connection 305, e.g. a clip or clamp. Even in this embodiment, each of the components can already have an integrated seal, for example.

Other variants of connecting the components to each other are also conceivable, which are not explicitly shown here. The components can also be connected by means of screws inserted perpendicular to the direction of flow. Screw connections parallel to the direction of flow are also conceivable by using suitable lugs in the corresponding component. The components can also be glued together.

Figure 4:
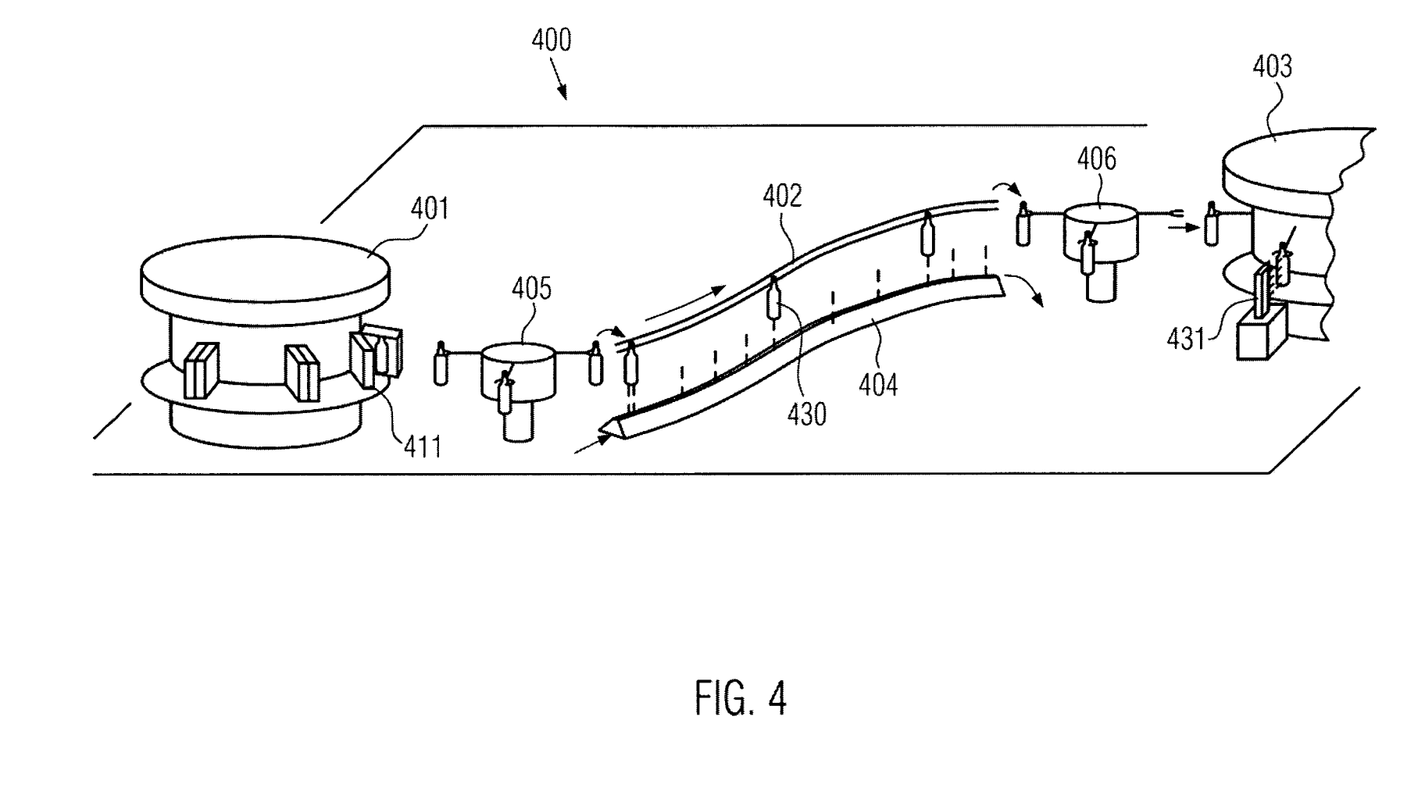
FIG. 4 shows a schematic representation of a container processing system according to an embodiment.

FIG. 4 shows a container processing system 400 in a workshop according to an embodiment. In the embodiment shown here, the container processing system comprises a blow molding machine 401, which is designed as a rotary unit and comprises several blow molds 411 at its circumference for the removal of containers from preforms. This embodiment, like the other embodiments of machines in FIG. 4, is not mandatory. Thus the blow molding machine can also be a linear machine or any other design.

In the transport direction of the containers 430, a rotary star 405 (not mandatory) is connected to the blow molding machine, which can take over the containers 430 from the blow molding machine and feed them to another transport device 402. In FIG. 4, the transport device 402 is designed, for example, as an air conveyor or neck-handling device which can hold the containers at their upper end (in the head area) and transport them along the arrow direction shown. However, the device can also be independently moving movers driven by a long stator linear motor.

A fluid channel 404 according to one of the embodiments described in FIGS. 1 to 3b is arranged directly below the transport device 402 and discharges the medium in the direction of the containers. This is followed by a further rotary star 406 (also not mandatory), which on the one hand takes over the containers from the transport device 402 and on the other hand transfers them to a container processing machine 403 downstream of the blow molding machines 401 in the process direction (i.e. in the transport direction of the containers).

In the embodiment shown here, the container processing machine is a printing machine to which a printing station 431 is assigned, which can equip the containers with a printing motif. The printing machine 403 is also designed rotary in this embodiment, which, as described, is not mandatory.

While the embodiment described in FIG. 4 is particularly based on the provision of two container processing machines arranged one after the other in the process direction and a fluid channel arranged between them, this is not to be understood as a limitation.

According to embodiments of the invention, a container processing system can also comprise a large number of container processing machines arranged one after the other in the process direction, in particular 3 or more. A fluid channel according to one of the above embodiments for cooling the bottom of the containers in a transport device can (but need not) be provided between adjacent container processing machines of such a system. The fluid channels do not have to be identical. This applies to their shape (cross-section and outlet openings) as well as to a medium used, for example, by the individual fluid channels. For example, one or more fluid channels can use a gaseous medium to cool the container bottoms, whereas one or more other fluid channels can use a liquid. Various gases and/or liquids can also be used.

A container processing system comprising a blow molding machine and a downstream labeling machine and a downstream filler can be considered as a special example. A first fluid channel can be provided between the blow molding machine and the labeling machine, and a second fluid channel between the labeling machine and the filler. In particular, the first fluid channel can cool the bottom of the container with a gas and the second fluid channel can use a liquid such as water as a medium. Each of the fluid channels can be manufactured according to the invention with a generative method.

What is claimed is:

1. A fluid channel of a container processing system for processing containers:
   the container processing system comprising a blow molding machine and a container processing machine arranged downstream of the blow molding machine in a process direction;
   the fluid channel being arranged downstream of the blow molding machine and upstream of the downstream container processing machine in the process direction;
   the fluid channel comprising a plurality of components, through which a fluid is to flow and which comprise at least one outlet opening through which the fluid is to exit from the fluid channel in a direction of a bottom of a container transported in the process direction; and
   wherein the plurality of components are components manufactured by a generative manufacturing method, and wherein the at least one outlet opening is designed as one or more nozzles.

2. A fluid channel according to claim 1, wherein the outlet opening comprises at least a first nozzle having a first predetermined outlet direction for the fluid and a second nozzle having a second predetermined outlet direction for the fluid that is different from the first predetermined outlet direction for the fluid.

3. A fluid channel according to claim 1, wherein at least one component of the plurality of components have a curvature.

4. A fluid channel according to claim 1, wherein at least one component of the plurality of components comprises comprising at least one fastening element for at least one of a) connecting to another component of the fluid channel or b) fastening the at least one component to a part of the container processing system.

5. A fluid channel according to claim 1, wherein an outer geometry of at least one component of the plurality of components is such that particles located on an outer surface of the at least one component move away from the bottom of the container under an influence of gravity.

6. A fluid channel according to claim 1, wherein at least one component of the plurality of components comprises a seal formed by the generative manufacturing method, the seal being an integral part of the at least one component.

7. A fluid channel according to claim 1, wherein the fluid is capable of flowing through a flow channel within the plurality of components and from there to the outlet opening, and wherein a cross-section of the flow channel varies perpendicularly to a direction of flow of the fluid.

8. A fluid channel according to claim 1, wherein an inner cross-section of at least one component of the plurality of components is different from an outer cross-section of the at least one component.

9. A method for producing a plurality of components of a fluid channel of a container processing system for processing containers, the method comprising:
performing a 3D printing process to print the plurality of components of the fluid channel;
wherein the container processing system comprises a blow molding machine and a container processing machine arranged downstream of the blow molding machine in a process direction;
wherein a fluid is to flow through the plurality of components; and
wherein the plurality of components comprise at least one outlet opening through which the fluid is to exit from the fluid channel in a direction of a bottom of a container transported in the process direction, and wherein the at least outlet opening is designed as one or more nozzles.

10. The method according to claim 9, wherein at least two components of the fluid channel are produced by the 3D printing process and the two components are produced in a process step of the 3D printing process.

11. The method according to claim 10, wherein all components of the fluid channel are manufactured in a process step of the 3D printing process.

12. A container processing system for processing containers, comprising:
a blow molding machine;
a container processing machine arranged downstream of the blow molding machine in a process direction; and
a fluid channel between the blow molding machine and the downstream container processing machine, wherein the fluid channel comprises a plurality of components through which a fluid is to flow and which comprise at least one outlet opening through which the fluid is to exit from the fluid channel in a direction of a bottom of a container transported in the process direction, and wherein the plurality of components are components manufactured by a generative manufacturing method, and wherein the at least one outlet opening is designed as one or more nozzles.

13. A container processing system according to claim 12, wherein the outlet opening comprises at least a first nozzle having a first predetermined outlet direction for the fluid and a second nozzle having a second predetermined outlet direction for the fluid that is different from the first predetermined outlet direction for the fluid.

14. A container processing system according to claim 12, wherein at least one component of the plurality of components comprises at least one fastening element for at least one of a) connecting to another component of the fluid channel or b) fastening the at least one component to a part of the container processing system.

15. The method of claim 9, wherein the 3D printing process comprises a multi jet fusion process.

* * * * *